US007575769B2

(12) United States Patent
de Levita et al.

(10) Patent No.: US 7,575,769 B2
(45) Date of Patent: Aug. 18, 2009

(54) PREPARATION OF AN EDIBLE PRODUCT FROM DOUGH

(75) Inventors: Paul David de Levita, Driebergen-R (NL); Marcellus Gerardus Sturkenboom, Houten (NL); Antonius Adrianus Gerardus van Duijnhoven, Wagenberg (NL); Gregory Reigh Worthington, Lake Oswego, OR (US); Hans Peder Heldt-Hansen, Virum (DK); John Slade, Wake Forest, NC (US)

(73) Assignees: Innovative Cereal System LLC, Wilsonville, OR (US); Bakery Technology Center BV (NL); Novozymes A/S (DK); Novozymes North America, Inc., Franklinton, NC (US)

( * ) Notice: Subject to any disclaimer, the term of this patent is extended or adjusted under 35 U.S.C. 154(b) by 428 days.

(21) Appl. No.: 10/941,436

(22) Filed: Sep. 15, 2004

(65) Prior Publication Data
US 2005/0136166 A1 Jun. 23, 2005

Related U.S. Application Data

(60) Provisional application No. 60/565,459, filed on Apr. 26, 2004, provisional application No. 60/504,032, filed on Sep. 19, 2003.

(51) Int. Cl.
*A21D 15/08* (2006.01)
*A21D 8/08* (2006.01)
(52) U.S. Cl. .......................... 426/94; 426/335; 426/532; 426/549; 426/602; 426/609; 426/811
(58) Field of Classification Search .................. 426/94, 426/602, 609, 496, 549, 335, 811, 532
See application file for complete search history.

(56) References Cited
U.S. PATENT DOCUMENTS

| 2,858,225 | A | | 10/1958 | Gooding et al. |
| 2,997,394 | A | | 8/1961 | Melnick et al. |
| 3,021,219 | A | | 2/1962 | Melnick |
| 3,111,409 | A | | 11/1963 | Jackson et al. |
| 3,556,798 | A | | 1/1971 | Tucker et al. |
| 3,716,381 | A | | 2/1973 | Ueno et al. |
| 3,779,796 | A | | 12/1973 | Ueno et al. |
| 3,900,570 | A | | 8/1975 | Stigler |
| 4,547,388 | A | * | 10/1985 | Strouss ........................ 426/609 |
| 5,133,984 | A | | 7/1992 | Murphy et al. |
| 5,382,440 | A | | 1/1995 | Sullivan |
| 5,472,482 | A | | 12/1995 | Willits et al. |
| 5,532,010 | A | | 7/1996 | Spanier et al. |
| 6,132,786 | A | | 10/2000 | Poulos et al. |
| 6,210,723 | B1 | | 4/2001 | Coleman et al. |
| 6,261,613 | B1 | | 7/2001 | Narayanaswamy |
| 6,613,376 | B2 | | 9/2003 | Smith et al. |
| 2004/0096548 | A1 | * | 5/2004 | Stevens et al. ................ 426/94 |
| 2006/0286213 | A1 | | 12/2006 | De Levita et al. |

FOREIGN PATENT DOCUMENTS

| WO | WO 91/04669 | 4/1991 |
| WO | WO 94/22313 | 10/1994 |
| WO | WO 99/08553 | 2/1999 |
| WO | WO 02/071864 | 9/2002 |

OTHER PUBLICATIONS

Catherine DeSa, The Bakers Digest, "Sorbic Acid its use in yeast-raised bakery products", pp. 50-52 (1966).
Melnick et al., The Bakers Digest, "Sorbic Acid as a fungistat in bakery production with special emphasis on a novel fungastatic shortening", pp. 46-53 (1956).
Simon S. Jackel, Bakery, "Technology Bakery", pp. 106, 108, 109, 111-112, 114 (1979).
Bernard A. Brachfeld, The Bakers Digest, "Antimicrobial Food Additives", pp. 60-70 (Oct. 1969).
Fred Barrett, The Bakers Digest, "Extending the Keeping Quality of Bakery Products", pp. 48-49 (Aug. 1970).
Malkki et al., The Bakers Digest, "Mold Inhibition by Aerosols", pp. 47-50 (Feb. 1978).
E.J. Pyler, Sosland Publishing Company, Baking Science and Technology, Third Edition, vol. 1, "Yeasts Molds and Bacteria", pp. 227-236 (1988).

(Continued)

*Primary Examiner*—Helen F Pratt
(74) *Attorney, Agent, or Firm*—Elias J. Lambiris; Jason I. Garbell; Kristin J. McNamara

(57) ABSTRACT

The present invention is directed to mold control and extended shelf life methods and compositions for preparing edible dough-based products, such as, for example, breads, by treating the surface of the dough used to prepare the edible product with at least one preservative and at least one pH adjusting agent prior to or during baking. The present invention is also directed to methods and compositions for preparing edible dough-based products, such as, for example, breads, by treating the surface of the dough used to prepare the edible product with a at least one pH adjusting agent prior to or during baking. The present invention is further directed to improved pan oil compositions for preparing edible dough based products which comprise at least one preservative in an amount effective to inhibit mold growth on the surface of the bread prepared from the dough and at least one pH adjusting agent in an amount effective to improve the activity of the at least one preservative and/or inhibit microbial growth on the surface of the bread prepared from the dough.

79 Claims, No Drawings

OTHER PUBLICATIONS

C.S. Hickey, Bakers Digest, "Sorbate Spray Application for Protecting Yeast-Raised Bakery Products", pp. 20-24 (Aug. 1980).

Thomas E. Furia, Handbook of Food Additives, $2^{nd}$ Edition, Ch. 3, "Antimicrobial Food Additives", pp. 115-184.

Y. Pomeranz et al., Cereal Chemistry, vol. 48, Nos. 1-6, "Note on the Use of Modified Salt in Doughs Containing Antimycotic Agents", pp. 23-26 (1971).

S. Brul et al., International Journal of Food Microbiology, vol. 50, "Preserve agents in foods" pp. 1-17, (1999).

He et al., Cereal Chemistry, "Changes in Bread Firmness and Moisture During Long-Term Storage", vol. 67. No. 6, pp. 603-605 (1990).

* cited by examiner

PREPARATION OF AN EDIBLE PRODUCT FROM DOUGH

CROSS-REFERENCE TO RELATED APPLICATIONS

This application claims priority or the benefit under 35 U.S.C. 119 of U.S. provisional application Nos. 60/504,032, filed Sep. 19, 2003, and 60/565,459, filed Apr. 26, 2004, the contents of which are fully incorporated herein by reference.

FIELD OF THE INVENTION

The present invention relates to processes and compositions for preparing edible products from dough and to processes and compositions for preparing edible dough-based products having improved mold resistance and extended shelf-life. The present invention also relates to compositions and baking pan release compositions containing preservatives.

BACKGROUND OF THE INVENTION

The growth of mold, rope, spoilage yeasts and bacteria is a significant problem in edible dough-based products, such as, for example, bread and other baked goods. Such microbial growth significantly reduces the commercial shelf life of the product, increasing the sellers' direct costs due to moldy products that cannot be sold to the consumer and limiting the time available for storage, distribution, display, sale and consumption of the product.

Various preservatives are on the market and are used to inhibit microbial growth so as to extend the shelf-life of edible dough-based products. See, e.g., E. J. Pyler, Baking Science & Technology, Vol. I, p. 227-236 ($3^{rd}$ Ed. 1988). Examples of such preservatives are sodium benzoate, calcium benzoate, potassium benzoate, sodium diacetate, paraben, niacin, calcium acetate, calcium diacetate, sorbic acid, sodium sorbate, calcium sorbate, potassium sorbate, sodium propionate, calcium propionate and potassium propionate. However, when used at concentrations that effectively increase shelf life, preservatives can impart an off-flavor, odor, color and/or texture (e.g., poor crumb structure) to the final product that is undesirable to the consumer. In addition, preservatives can also inhibit yeast cultures which are used to prepare the dough-based product, resulting in manufacturing problems, such as, proofing problems, and increasing costs due to the need to use greater amounts of yeast to offset the yeast inhibition.

Because of the problems associated with the use of preservatives in dough-based products, as a compromise, it has been necessary in the art to employ relatively low concentrations of preservatives, that is, preservative concentrations which provide some anti-mold effect, but do not create unacceptable processing conditions due to yeast dosage requirements or unacceptable impairment to the flavor, odor, color and/or texture of the product. Accordingly, the prior art discloses the use of preservatives, such as, calcium propionate, sodium propionate, sorbic acid, potassium sorbate and sodium benzoate, in dough and baked products at very low concentrations. For example, U.S. Pat. No. 3,900,570 discloses a maximum usage of calcium propionate of 0.25 parts by weight per 100 parts of flour in the finished dough, with the preferred range being about 0.06 to about 0.12 parts. U.S. Pat. No. 4,416,904 discloses concentrations of 0.04% to 0.10% for sodium benzoate, 0.05% to 0.20% for sorbic acid, and 0.4% for calcium propionate. Similarly, E. J. Pyler, Baking Science & Technology, Vol. I, p. 227-236 ($3^{rd}$ Ed. 1988), discloses that calcium propionate is normally used in the amount of 2.5 to 3.5 oz/100 lb flour. More recently, WO 99/08553 discloses that preservatives, such as, sodium and calcium propionate, are typically added to bakery products in small concentrations in the range of 0.1 to 0.625%, calculated on the weight of the flour.

A number of solutions have been proposed to avoid the problems associated with the use of preservatives in edible dough-based products. U.S. Pat. No. 2,997,394, for example, discloses incorporating a preservative into an edible fat having a high melting point, which is then dispersed throughout the dough. By incorporating the preservative into the edible fat composition, it was reported to be possible to use the preservative in the dough in an amount of about 0.025 to 0.2%, the range depending on the particular preservative, while avoiding unacceptable side effects, such as, yeast inhibition.

Similarly, WO 99/08553 discloses encapsulating a preservative, such as, calcium propionate, into a degradable and edible fatty acid substance which is then dispersed in the dough system, and ultimately released. Again, the encapsulation of the preservative is stated to have the benefit of avoiding inhibition of the microbial culture used to prepare the food product. However, yeast inhibition remains a problem with preservative encapsulation technologies, presumably caused by leakage of the preservative from the encapsulation layer into the dough.

U.S. Pat. No. 6,132,786 proposes another solution for obtaining improved mold Inhibition without impacting the organoleptic properties of the baked product by using food grade metabolites produced by *Propionibacterium sp*, instead of traditional preservatives, such as, propionic acid. The metabolites are reported to have a neutral taste, which does not change the flavor of the product, as compared to propionic acid, which is stated to have a distinct unpleasant taste. The metabolites are also stated to not result in deleterious changes in the consistency or structural integrity of the finished or stored baked product. Nevertheless, it has been difficult to obtain effective and uniform mold inhibition using propionibacteria metabolites.

In addition to the incorporation of small concentrations of preservatives into the dough, preservatives have also been applied to the surface of the baked product, that is, to the exterior of the baked product after baking. As with the case of the use of preservatives inside the dough, preservatives have been applied to the surface of the baked product in small amounts.

Hickey, C. S. Bakers Digest, 54 (4), 20 (1980), for example, reported that a spray application of a 1.0 to 1.5% sorbate solution on hot, freshly baked breads, buns and rolls, and English muffins was effective to increase the shelf-life of the products. The surface treatment was reported to result in sorbate residuals equivalent to 0.02% based on flour.

Malkki and Rauha, Bakers Digest 52 (1), 47 (1978), disclose an aerosol method for mold inhibition in which a solution of propionic acid is atomized at a concentration of 15 mg/liter into an aerosol within an enclosed cooling tunnel through which the bread is conveyed. It is reported that the bread will absorb a concentration of 0.05% of the inhibitor in a 2 mm-thick crust.

He and Hoseney, Cereal Chem, 67 (6), 603-606 (1990), disclose spraying of calcium propionate solution on the surface of bread after baking and after cooling the bread for 50 minutes or 10 minutes. The calcium propionate was added in a very small amount (a 0.2% solution).

Although the addition of preservatives to the surface of the products after baking has been proposed as an alternative to adding the preservative into the dough, because the surface of freshly baked products is fragile and easily damaged, the application of preservatives to the surface of freshly baked products is often undesirable because it can result in the formation of stripes, discoloration, and/or breakage of the product. In addition baked products, such as, bread, are also bulky and hard to handle, thus, making it difficult to uniformly and economically apply the preservative to the surface of the baked product after preparation.

Preservatives have also been applied to the dough prior to heating. U.S. Pat. No. 3,021,219, for example, discloses the addition of 0.5% to 10% of the preservative sorbic acid to pan grease to prevent mold growth. Melnick et al., Sorbic Acid as a Fungistat in Bakery Production With Special Emphasis on a Novel Fungistatic Shortening, The Bakers' Digest 46 (1956), discloses the use of a fungistatic shortening containing sorbic acid or propionate, which is applied to the surface of the dough. DaSa, Sorbic Acid: Its Use in Yeast-Raised Baker Products, The Bakers' Digest 50 (1966), discloses dispersing the combination of sorbic acid and calcium propionate in a vegetable oil, which is applied to brown'n serve rolls before baking. The treatment was also combined with the addition of calcium propionate into the dough and by spraying the surface of the rolls after baking.

In addition to the use in preserving food products, non-toxic, food grade preservatives have also been used in pan release compositions in very low amounts for the purpose of preserving the pan release composition. For example, WO 94/22313 discloses the use sorbic acid, acetic acid, phosphoric acid, benzoic acid and propionic acid, in very small amounts as preservatives of the pan release compositions. In particular, WO 94/22313 discloses a pan release composition comprising 0.25% sorbic acid and 0.25% acetic acid, with the percentage of the preservative being based on the percentage of the pan release composition.

In addition to microbial growth, another major factor which impacts the commercial shelf life of the edible dough based products is the softness of the product, which deteriorates during storage in a process commonly referred to as staling. The staling of a dough based product, such as bread, is generally characterized by an increase of the firmness of the crumb, a decrease of the elasticity of the crumb, and changes in the crust, which becomes tough and leathery. Chemical and enzymatic agents have both been used in the industry to retard staling. WO 91/04669, for example, describes the use of a maltogenic alpha-amylase to retard the staling of baked products.

SUMMARY OF THE INVENTION

The present invention is directed to methods and compositions for preparing edible dough-based products, such as, for example, breads, buns, rolls, English muffins, cake muffins, bagels doughnuts, tortillas, cakes, biscuits, cookies, pie crusts and pizza crusts, preferably, yeast raised dough products, such as breads.

One aspect of the present invention relates to methods and compositions for preparing edible dough-based products by applying a preservative composition, preferably, a mold inhibitor, to the surface of dough prior to or during heating. The application of an effective amount of one more preservatives to the surface the dough prior to or during heating can be used to provide effective microbial inhibition during storage of the dough based product, such as, effective mold inhibition. Although not limited to any one theory of operation, the methods and compositions of the present invention are believed to significantly inhibit spoilage microbial growth on the surface of the dough based product, in particular, during the critical period after heating the dough (e.g., following baking) and prior to packaging, which results in a significant extension in the shelf life of the dough based product. The methods and compositions of the present invention are particularly suited for inhibiting spoilage microbial growth on the surfaces of dough based products which are in contact with baking pans during preparation of the product, e.g., the bottom and side of a bread which are in contact with the baking pan, as these are the areas of the dough based product which are believed to be more susceptible to spoilage microbial growth.

In a preferred embodiment, a pH adjusting agent, such as triacetin, preferably, a pH lowering agent, more preferably, a heat activated pH adjusting agent, is applied to the dough in combination with the preservative. A particularly preferred pH adjusting agent is triacetin, which, when used in combination with a preservative, as described herein, can be used to significantly extend the shelf-life of the dough-based product. The pH adjusting agent may be applied simultaneously with the preservative, such as, e.g., as part of the same composition or through a separate process stream that is applied simultaneously, e.g., through the same spray nozzle. Alternatively, the pH adjusting agent may be applied separately (sequentially) from the preservative on the exterior surface of the dough or dough based product, such as, prior to application of the preservative or after application of the preservative.

When a preservative is applied to the surface of the dough or dough based product, the preservative can increase the pH in the localized environment of the surface of dough or dough based product. The increase in pH can reduce the effectiveness of the preservative and/or provide conditions that are more optimal for microbial growth. Although not limited to any one theory of operation, the pH adjusting agent, such as triacetin, is believed to act synergistically with the preservative to further preserve and extend the shelf life of the dough based products by directly inhibiting microbial growth, e.g., by creating pH conditions which are not suitable for the microbial growth, and by creating a more optimum pH environment for the preservative. In accordance with the present invention, a pH adjusting agent is preferably used to lower the pH on the surface of the dough, more preferably, to a pH that at least compensates for the pH increase caused by the use of the preservative, and even more preferably, to further lower the pH to more optimal pH conditions for the preservative or for inhibiting spoilage microbial growth. By adjusting the pH in the localized environment of the surface of the dough, the present invention may also prevent the loss of preservative activity at the surface of the product resulting from the migration of the preservative from the surface to the interior.

Yet another aspect of the present invention relates to methods and compositions for preparing edible dough-based products by applying a pH adjusting agent, such as triacetin, to the surface of dough prior to or during heating. The pH adjusting agent may be applied to the surface of the dough or dough-based product in combination with the application of a preservative to the surface of the dough or dough-based product, as described herein, or the pH adjusting agent may be applied without application (simultaneous or sequential) of a preservative on to the surface of the dough. The pH adjusting agent can itself provide a preservation effect by directly inhibiting microbial growth, e.g., by creating pH conditions which are not suitable for the microbial growth. The treatment of the surface of the dough or dough-based product with a pH adjusting agent may be used in combination with other preservation techniques, such as, the addition of a preservative into the dough before baking.

The preservative and/or a pH adjusting agent, such as triacetin, may be applied to the surface of the dough or dough based product in any suitable manner, such as, by treating or coating the dough, including, by treating or coating a surface which contacts or holds the dough during processing of the dough and preparation of the edible product, such as, e.g., a baking pan, a container, packaging, a conveyor, or a cutting knife. In a preferred embodiment, the preservative composition and/or pH adjusting agent is applied to the surface of the dough by treating a pan used to prepare the dough based product, preferably, prior to filling the pan with the dough. In preferred embodiment, the preservative is applied to the surface of the dough in amount to obtain at least 0.05% of the preservative in the surface of the product prepared from the dough (e.g., crust of the bread), more preferably, 0.05 to 5%, preferably, 0.05 to 2%, such as, 0.05 to 0.5% of the preservative in the surface of the product or a surface which is in contact with the product (e.g., a pan, container, etc.) prepared form the dough.

The preservative composition and/or pH adjusting agent may also be applied to the dough by treating, e.g., spraying, the surface of the dough, prior to or after adding the dough to a pan, and/or by treating the surface of the dough or dough based product which is not in contact with the surface of the cooking pan, such as, by treating (e.g., spraying) the top or other exposed surface of the dough.

The treatment of the surface of the dough with a preservative composition and/or pH adjusting agent (prior to or during cooking) may also be used in combination with the addition of a preservative onto the surface of the edible product after cooking (e.g., after baking).

The treatment of the surface of the dough as described herein, may also be used in combination with the addition of an amount of preservative in the dough, that is, inside the dough rather than on the surface of the dough. Accordingly, in a preferred embodiment, the present invention relates to methods of producing dough based products by applying at least one preservative in the dough and by applying at least one preservative and/or pH adjusting agent on the surface of the dough, wherein the combination of the preservative in the dough and on the application of the preservative and/or pH adjusting agent on the surface of the dough provides the desired microbial inhibition during storage.

Although the addition of a preservative and/or pH adjusting agent on the surface of the dough or dough based product may be used in combination with the addition of an amount of preservative inside the dough or the dough based product, the present invention is preferably used to reduce or even eliminate the use of preservatives added in the dough, and thus to reduce or avoid the problem of yeast inhibition (and consequent need to increase yeast dosages to offset the inhibition during processing) as well as the problems in off-flavor, odor, color and/or texture resulting from the use of preservatives in dough. More preferably, the ability to reduce or eliminate the use of preservatives added in the dough is achieved by the application of the preservative to the surface of the dough in combination with the treatment of the surface of the dough or dough based product with a pH adjusting, preferably, a pH lowering agent, which significantly enhances the activity of the preservative, more preferably, a pH adjusting agent which is activated at baking temperature. Such higher surface concentrations of preservative can be obtained by the surface application of the preservative as described herein.

The present invention further relates to methods and compositions for preparing dough based products and dough based products having a high concentration of a preservative in the surface of the dough based product (e.g., bread crust), such as, at least 0.05% of the preservative in the surface of the dough based product (e.g., crust of a bread), more preferably, 0.05 to 5% of the preservative in the surface of the dough based product, and having a low concentration, including 0%, of a preservative in the dough based product (e.g., in the bread crumb), such as, less than 0.5%, less than 0.1%, less than 0.01%, less than 0.001% of the preservative in the dough based product, more preferably between 0 to 0.5% of the preservative in the dough based product.

Any suitable composition may be used to apply the preservative and/or pH adjusting agent to the dough or dough based product, including aqueous compositions, oil based compositions, and emulsions. In a preferred embodiment, the composition is an oil based composition, such as, for example, an oil composition having an oil as the main carrier or the only carrier component, or a composition comprising an oil as one of the main components of the composition, such as, a water-in-oil emulsion, an oil-in-water emulsion or a composition comprising a mixture of oils, waxes and lecithin. In a more preferred embodiment, the composition is a sprayable composition, more preferably, a composition that can be applied to the dough or to a surface which contacts the dough during processing of the dough into the bread, e.g., a pan, in a pre-oven spraying process.

Any suitable preservative may be used, including oil soluble preservatives, such as, e.g., glycerol tripropionate, or water soluble preservatives, such as, e.g., calcium propionate or sorbic acid. More preferably, and in particular, when using preservatives that are not soluble in oil compositions, such as, in sprayable oil compositions, the preservative and/or pH adjusting agent should preferably be in the form of finely dispersed particles. Although not limited to any theory of operation, the use of fine preservative particles, that is, having a small maximum particle size, and fine pH adjusting agents provides proper dispersion or suspension of these components in the composition, and provides superior preservation when applied to the dough.

When the composition is an oil composition and the preservatives and/or the pH adjusting agents are not oil soluble, the composition also preferably comprises a high melting fatty substance (particles) and/or wax substance (particles). Preferably, the fatty substance and/or wax substance has a melting point above 40° C., more preferably above 50° C., above 60° C., or above 65° C. Although not limited to any one theory of operation, the fatty substance and/or wax particles are believed to further maintain proper dispersion or suspension of the preservative particles and/or pH adjusting agents in the oil based composition and to promote the effective application of the components to the dough and/or dough based product. However, if the preservative and/or pH adjusting agents are extremely fine, the use of fatty material and/or wax material to obtain the desired dispersion may preferably be reduced or avoided.

The preservative and/or pH adjusting agent are preferably applied in combination with a pan release agent. Preferably, such components are applied simultaneously, such as, as components of a pan release composition, that is, a pan release composition comprising (i) at least one pan release agent and (ii) at least one preservative and/or at least one pH adjusting agent in an amount effective to inhibit mold growth in the dough based product prepared in a pan treated with the pan release composition. More preferably, the pan release composition comprises both a preservative and pH adjusting agent. Accordingly, another aspect of the present invention is directed to pan release compositions comprising one or more preservatives and/or one or more pH adjusting agents in an amount effective to inhibit spoilage microbial growth during storage of the dough-based product prepared in a pan treated with the pan release composition, and to pans treated or coated with such compositions.

The preservative and/or pH adjusting agent may also be applied to a dough simultaneously by application to a cooking pan (e.g., baking pan or frying pan) used to prepare a dough based product by a separate process stream or composition applied at the same time as the pan release composition, e.g., through an application system having two separate process streams that are applied simultaneously to the pan, such as, by spraying simultaneously through the same spray head.

Alternatively, the preservative and/or pH adjusting agent are applied sequentially in combination with a pan release composition in the desired order, e.g., the pan release composition may be applied first, followed by the preservative and/or a pH adjusting agent. Alternatively, the preservative and/or pH adjusting agent may be applied first, followed by the pan release composition. In addition, combinations of simultaneous and sequential applications may also be used, as desired, for example, the pan release composition may be applied first followed by the simultaneous application of both the preservative and the pH adjusting agent, or simultaneous application of the preservative and pan release agent, followed by application of a pH adjusting agent.

Yet another aspect of the present invention relates to methods and composition for treating prepared dough based products, that is, after heating the dough to produce the product, by treating the prepared dough based product with a preservative and/or pH adjusting agent, preferably, shortly after heating, such as, immediately following (i.e., seconds to minutes after the product leaves the oven or cooking process, e.g., 1 to 30 minutes, preferably 1 to 15 minutes). Such processes may preferably be used in combination with the treatment of the dough prior to or during heating, as described herein, and in combination with other preservation methods, such as, the addition of a preservative inside the dough.

Yet another aspect of the present invention is directed to the preservation methods and compositions described herein in combination with anti-staling methods and compositions, preferably, one or more anti-staling enzymes, more preferably, a maltogenic alpha-amylase, and even more preferably, a maltogenic alpha-amylase which is added into the dough prior to heating the dough. In a preferred embodiment of this aspect of the invention, the present invention provides a process for preparing an edible product comprising applying one or more preservatives and/or one or more pH adjusting agents to the surface of the dough, and heating the dough, wherein the dough preferably comprises one or more anti-staling agents, more preferably, one or more anti-staling enzymes, and even more preferably, a maltogenic alpha-amylase.

Yet another aspect of the present invention is directed to methods for preparing dough based products for inventory, such as, for example, methods of baking bread for inventory. In particular, the present invention also provides methods for preparing dough-based products which can be stored for a longer period of time following preparation, and before delivery or sale, and/or which can be distributed over greater distribution network, over a greater distance from the production site and/or by a slower distribution method.

Some of the factors restricting the ability to significantly extend shelf-life of dough-based products have been the problems of yeast inhibition, off-flavor, odor, taste and/or texture resulting from concentrations of preservatives which are necessary to obtain the longer shelf-life. Accordingly, the present invention provides methods and compositions for applying an effective amount of a preservative to the dough-based product so as to obtain a significant extension in shelf life, but to still produce a commercially acceptable product, that is, a product having suitable organoleptic and structural properties, and by an economical production process, that is, by avoiding excessive yeast dosage requirements. Thus, when the spoilage microbial inhibition methods of the present invention are used in combination with anti-staling agents, preferably, anti-staling enzymes, more preferably, an anti-staling effective amount of a maltogenic alpha-amylase, a significant extension in shelf life can be obtained, as defined by both microbial inhibition during storage (e.g., mold inhibition) and the softness of the product (anti-staling). In preferred embodiments, the present invention is directed to dough based products that are characterized by having a longer shelf life than dough based products prepared by other methods, e.g., a shelf life of at least 20 days to 90 days, as defined by mold inhibition and softness of the product.

Yet another aspect of the present invention relates to the application of very high amounts of preservatives to dough based products, in particular, 2.0 to 20% preservative solution, such as, 10 to 20% preservative solution, may be applied to the surface of the dough and/or to the surface of a baked product without resulting in unacceptable yeast inhibition, off-flavor, odor, taste and/or texture problems.

DETAILED DESCRIPTION OF THE INVENTION

The present invention is directed to methods and compositions for preparing edible dough-based products by applying a preservative, preferably, a mold inhibitor, and/or pH adjusting agent to the surface of a dough or dough based product. Advantageously, the methods and composition described herein can be used to significantly extend the shelf life of edible dough based products, such as, bread, tortillas, cakes, pancakes, biscuits, cookies, pie crusts, more preferably baked products, such as, bread products.

The dough used to prepare the dough based product generally comprises flour, e.g., from grains, such as, wheat flour, corn flour, rye flour, oat flour, or sorghum flour. The dough is generally leavened by the addition of a suitable yeast culture, such as a culture of *Saccharomyces cerevisiae* (baker's yeast) or a chemical leavening agent.

The edible dough based product may preferably be any kind of baked product prepared from dough, either of a soft or a crisp character, either of a white, light or dark type. Preferred edible dough based products include bread (in particular white, wheat, whole-meal, low-carb, brown, multi-grain, dark and rye bread), typically in the form of loaves, buns or rolls, and more preferably, pan bread, hamburger buns, French baguette-type bread, pita bread, tortillas, cakes, pancakes, biscuits, cookies, pie crusts, crisp bread, steamed bread, pizza crust and the like.

The edible dough based product may also be prepared by frying (e.g. deep frying in hot fat or oil). An example of such an edible product is a doughnut.

As used herein, a "preservative" is an agent which inhibits the growth of mold, rope, spoilage yeasts and/or bacteria on or in the edible dough based product during storage. Any suitable preservative may be used, including combinations of preservatives. Preferably, the preservative is an anti-mold agent, also referred to herein as a "mold inhibitor." Non-limiting examples of preservatives include sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate, sorbic acid, and acetic acid. Other preservative include a bacteriocin, nisin and natamycin. In preferred embodiments, combinations of preservatives are used, including combinations of the previous list of preservatives, to provide a synergistic effect.

In preferred embodiments, the preservative is water-soluble, such as, propionic acid or a propionate, e.g., calcium propionate, a sorbate, e.g., potassium sorbate, a benzoate, e.g., sodium benzoate, or citric acid. In other preferred embodiments, the preservative is oil-soluble, such as, e.g., a propionic acid ester such as glycerol mono-, di- or tri-propionate (mono-, di- or tripropionin). Sorbic acid, propionic acid or a volatile ester such as ethyl propionate may also be used. In other preferred embodiments, the preservative may be dissolvable in alcohol (ethanol), such as, e.g., sorbic acid.

The selection of the preservative preferably depends on the pH of the dough or dough based product, which is an important factor for both the undesired inhibitory effect of the preservative on the yeast during preparation of the product and the desired microbial inhibition (e.g., mold inhibition) which occurs during storage of the product. Accordingly, the pH conditions preferably should be optimized according to the preservative used. For example, propionate is generally mold and yeast inhibitory when it is in the acid form (propionic acid), and the equilibrium between propionate and propionic acid is dependent on pH. Propionate, for example, is therefore not very efficient in bread procedures where the pH of the crumb or surface of the bread is high (above 5.5) and far more efficient in bread produced by the sponge and dough procedure where the pH of the bread crumb or surface of the bread is lower (around 5.0), and it is even more efficient in bread produced by sour dough techniques. Other preservatives have different pH optimums, as are known in the art. Accordingly, the pH should also preferably be considered when the preservative is selected and/or the amount of preservative is optimized.

The preservative is applied in an amount effective to inhibit mold, rope, spoilage yeast, and/or bacteria growth during storage of the dough-based product. Microbial inhibition (during storage) is usually determined by visual inspection for microbial growth, such as, when the first mold growth appears on the product to the unaided eye. The amount of preservative added will vary depending on the shelf-life desired, as well as the type of edible product being prepared, that is, a greater concentration of preservative should be added if a longer shelf life is desired. Optimization of the amount of preservative can be performed using dosage optimization experiments. In preferred embodiments, the preservative is applied in an amount such that the first spoilage microbial growth (e.g., mold) does not appear on the product until at least 5 days from cooking (e.g., baking), more preferably, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, at least 20 days, at least 21 days, at least 22 days, at least 23 days, at least 24 days, at least 25 days, at least 26 days, at least 27 days, at least 28 days, at least 29 days, at least 30 days, at least 40 days, at least 50 days, at least 60 days, at least 70 days, at least 80 days, at least 90 days, from preparation (e.g., baking), as can determined by visual inspection after the product is stored at ambient temperatures and humidity in closed polyethylene bags after the bread has cooled down after baking unwrapped for about 10 minutes to about 3 hours.

Further embodiments of the present invention are directed to methods and compositions for inhibiting microbial growth (preferably, mold growth) in dough-based products by applying a preservative to the surface of dough in an amount of at least 0.01 to 5 milligrams of the preservative per $cm^2$ of the surface of the dough prior to or during cooking (baking), preferably 0.1 to 2 milligrams of the preservative per $cm^2$ of the surface of the dough prior to or during cooking.

The amount of preservative applied will vary depending on the location in which the product is being prepared, distributed, or sold or during the period for consumption. For example, as is known in the art, preservative usage varies depending on the region, including, the climate and conditions of the manufacturing facility, and depending on the temperature, humidity, and rain amount of the region. As shown, for example, in the following table (which presents examples typical dosages of the preservative calcium propionate added into the dough to obtain traditional 12 to 18 day shelf life by region), the calcium propionate level added into the dough will vary depending on the region:

| REGION (United States) | % of Calcium Propionate |
| --- | --- |
| Pacific Northwest | 0-0.18 |
| California | 0.2-0.3 |
| Upper Central | 0.15-0.25 |
| Lower Central | 0.2-0.3 |
| East Coast/Northern | 0.2-0.3 |
| Southeast Coast | 0.3-1.0 |

Similarly, such environmental factors should therefore also be consider when applying the preservative to the surface of the dough, and preferably, the amount of preservative added is optimized based on the type of product, the region of manufacture, the facility of manufacture, and the method of manufacture.

The amount of preservative added to the surface of the dough will also vary depending on whether a preservative, preferably, a small amount, is applied into the dough, such that the desired microbial inhibition (e.g., mold inhibition) in or on the product is based a combination of the preservative on the surface of the dough. However, as show in Example 4, it is believed that only very little amount of the preservative will be present in the surface of the product (e.g., crust of bread) based on the addition of the preservative into the dough. In some embodiments, it is preferred to add a preservative into the dough, preferably, at a low dosage, such as, less than 0.5% by weight relative to the flour in the dough, more preferably, between 0.05-0.5%, e.g., 0.1-0.2%, in combination with the addition of the preservative to the surface of the dough, as described herein.

The amount of preservative added to the surface of the dough will also vary depending on whether a preservative, preferably, a small amount, is applied onto the surface of the dough-based product after cooking, for example, after baking. Thus, the amount added to the surface of the dough should also be adjusted based on the amount of preservative that will subsequently be added to the dough based product after cooking.

Controlling pH, in particular, the pH of the surface of the dough or dough based product, can be used to significantly improve spoilage microbial inhibition as defined by this invention, preferably by using a pH adjusting agent. As used herein, a "pH adjusting agent" is an agent which can be used to adjust the pH of surface of the dough or dough based product. Preferably, the pH adjusting agent is a pH lowering agent, such as, triacetin (102-76-1). More preferably, the pH adjusting agent is a temperature (heat) activated pH adjusting substance which, at baking temperatures, is broken down into components which will cause a reduction in the pH in the localized environment of the surface of the dough or dough-based product. In another preferred embodiment, the pH adjusting agent is an agent which converts from a solid or liquid composition to a vapor or gas composition at baking temperatures of about 150° C. to 300° C., more preferably about 230° C. for bread (420-460° F.), wherein the dough and or dough-based product is treated with the pH adjusting agent in vapor or gaseous form, e.g., when vapor or gaseous pH adjusting agent is circulated in a treating chamber, such as, an oven, containing the dough or dough-based product.

Examples of suitable pH adjusting agents include, e.g., triacetin, monocalcium phosphate, acetic acid, citric acid, pyrophosphate, sodium phosphate, potassium phosphate, and combinations thereof. A particularly preferred pH adjusting agent is triacetin, which when used in combination with a preservative in the surface treatment of dough and dough based products can significantly extend shelf life of dough based products.

The pH adjusting agent is applied in an amount effective to alter the pH of the surface of the dough or dough based product, more preferably to lower the pH of the surface of the dough product, and more preferably, to lower the pH of the surface of the dough based product during the period before packaging of the dough based product, such as, during cooling of the product following cooking.

When used in combination with a preservative, preferably, the pH adjusting substance should be used in an amount effective to counter or at least partially counter any pH increase at the surface caused by the preservative and/or to improve the activity of the preservative on the surface of the dough and/or dough-based product (e.g., bread). More preferably, the pH adjusting agent should be used in an amount effective to obtain more optimal pH conditions for inhibiting spoilage microbial growth and to thereby inhibit microbial growth on the surface of the dough and/or dough-based product. In another preferred embodiment, the pH adjusting agent may also be added in an amount effective to lower the pH of the surface of the dough and/or dough-based product by a factor of at least 0.05 pH units, more preferably, at least 0.01 pH units, more preferably, at least 0.1 pH units, at least 0.5 pH units, at least 1 pH unit, at least 1.5 pH units, or at least 2 pH units, such as, 0.1 to 2 pH units, 0.1 to 1.5 pH units, 0.1 to 1 pH units, and 0.1 to 0.5 pH units. The pH adjusting agent can also be used to adjust the pH to a target pH (target pH for the preservative or bread composition), e.g., the target pH for bread is preferably pH 4.9 to 5.1. Optimization of the amount of pH adjusting agent can be performed using dosage optimization experiments.

The preservative and/or pH adjusting agent may be applied to the surface of the dough or dough based product in any suitable application process, preferably, by coating the surface of the dough or dough based product with an effective amount of a preservative and/or an effective amount of a pH adjusting agent, including by treating or coating a surface which contacts or holds the dough or dough based product (e.g., pans, containers, packaging, pans, cutting knives, conveyors, and lids (e.g., for lidded bread and dough products). In a preferred embodiment of the present invention, a preservative and/or a pH adjusting agent, is applied to the surface of the dough or dough based product by applying the preservative to the pan used to prepare the dough based product, (e.g., a baking pan).

In a preferred embodiment, the preservative and/or the pH adjusting agent are applied by spraying the dough or dough based product with the preservative and/or pH adjusting agent. More preferably, the dough or dough based product is sprayed with an aqueous composition (e.g., a concentrated solution of the preservative and, preferably, a pH adjusting agent) or oil based composition.

In another preferred embodiment, the preservative and/or the pH adjusting agent are applied by passing the dough or dough based product through a vapor containing the preservative and/or pH adjusting agent. More preferably, the dough or dough based product may be passed through vapors of a volatile preservative (such as, propionic acid or ethyl propionate) and/or a volatile pH adjusting agent. In a preferred embodiment, the preservative and/or pH adjusting agent are applied by an aerosol method in which a solution of the preservative and/or pH adjusting agent is atomized into an aerosol within an enclosed tunnel through which the dough or dough based product is conveyed.

In another preferred embodiment, the preservative and/or pH adjusting agents are applied to the surface of the dough by applying the preservative and/or pH adjusting agent to the pan used to prepare the dough based product, and preferably, the preservative and/or pH adjusting agent are also applied to the portion of the dough which is not in contact with the pan, for example, by spraying the exposed surface of the dough.

The methods and compositions of applying preservatives and/or pH adjusting agents to the surface of dough or the dough-based product, as described herein, may also be combined with other preservation methods to obtain the desired microbial inhibition during storage, including, adding a preservative into the dough, as is known in the art, and adding a preservative onto the surface of the product after cooking (e.g., baking). In a preferred embodiment, a preservative, e.g., at least 0.05% to 2% based on the weight of flour, more preferably 0.05 to 0.5% based on the weight of flour, is added into the dough in combination with the addition of a preservative to the surface of the dough, as described herein.

In another preferred embodiment, a preservative and/or pH adjusting agent are applied to the surface of the dough before heating (e.g., before baking), as described herein, and then an additional desired amount of a preservative and/or pH adjusting agent are applied to the surface of the product after heating (e.g., after baking). For example, in a preferred embodiment, an additional amount of a preservative and/or pH adjusting agent is added to a post-oven topping system or edible glue (e.g., comprising starch or a gum) which is applied (e.g., sprayed or coated) on the product after the heating. Examples are seed adhesion systems applied to hamburger buns after baking, cereal and seed toppings applied to bread loaves and top coating or icing applied to doughnuts after frying. Preferred examples of post topping applications include the use of edible glues, such as, starch-based glues which contain the preservative and/or pH adjusting agent.

Preferably, non-chemical microbial inhibition (e.g., mold inhibition) methods and compositions are also used, such as, for example, sterilizing packaging and sterilizing the machinery and plant, such as, for example, by using germicidal ultraviolet rays to sterilize the atmosphere in which the products are exposed. See, e.g., E. J. Pyler, Baking Science & Technology ($3^{rd}$ Ed. 1988).

Any suitable composition may be used to apply the preservative and/or pH adjusting agent to the dough or dough based product, including aqueous compositions, oil based compositions and emulsions, wherein the preservative and/or pH adjusting agent is dissolved, suspended, dispersed, or partially dissolved or partially suspended in such composition, as appropriate. As used herein, "an oil based composition" includes an oil composition having an oil as the main carrier or the only carrier component, or a composition comprising an oil as one of the main components of the composition, such as, a water-in-oil emulsion, an oil-in-water emulsion or a composition comprising a mixture of oils, waxes and lecithin. In a more preferred embodiment, the composition is a sprayable composition, more preferably, a composition that can be applied to the dough in a pre-oven spraying process.

The preservative and/or pH adjusting agent composition is preferably an oil-based composition. Suitable oils include animal, vegetable or synthetic oil, or an oil fraction selected from the groups consisting of a food grade mineral oils, coconut oil, palm oil, palmkernel oil, soy bean oil, corn oil, cottonseed oil, sunflower oil, ground nut oil, safflower oil, tallow, high erucic rape oil, low erucic rape oil and mixtures thereof. Preferably, the oil is a high temperature stable oil.

The preservative particles and/or pH adjusting agent particles are preferably finely dispersed, having a maximum particle size below 1000 µm, below 900 µm, below 800 µm, below 700 µm, below 600 µm, more preferably, below 500 µm, below 400 µm, or below 300 µm. More preferably, the particles have a maximum particle size below 200 µm, below 150 µm, below 100 µm, below 75 µm, below 50 µm, below 40 µm, or below 30 µm. Particle size may be determined using standard process and equipment known in the art, such as, e.g., a laser particle counter, and the desired maximum particle size may be obtained by any suitable method, such as, by sieving the particulate material.

The use of finely dispersed particles is particularly preferred when the preservative and/or pH adjusting agent composition is an oil based composition, and when the preservative and/or pH adjusting agent are not oil soluble, e.g., an oil based composition comprising calcium propionate, and more preferably, in such compositions, the preservative particles and/or the pH adjusting agent particles should have a particle size below 200 µm, below 150 µm, below 100 µm, below 75 µm, below 50 µm, below 40 µm, or below 30 µm.

Notwithstanding the above, some preservative particles may be larger, e.g., at most 0.5%, 1%, 2%, 3%, 4%, 5%, 6%, 7%, 8%, 9%, 10%, 20%, 25%, 50%, 60%, 70%, 80%, 90% of the particles may be larger than a stated minimum. For example, a suitable calcium propionate may contain at most 1% by weight of particles larger than 500 µm. Another suitable calcium propionate may contain at most 5% by weight of the particles larger than 250 µm, or 60% of the weight of the particles larger than 125 µm, or 95% of the weight of the particles larger than 90 µm.

For an oil based preservative and/or pH adjusting composition, the composition should preferably also comprise a fatty substance and/or wax, more preferably, a high melting fatty substance or wax in an amount to maintain the dispersion of the particles in the oil-based composition and to promote the effective release of the preservative and/or pH adjusting agent. More preferably, the preservative and/or pH adjusting composition comprises from 0.5% to 20% of high melting fatty substance (particles) and/or wax substance (particles), preferably between 1% to 10% of a high melting fatty substance and/or wax.

Suitable fatty substances include, e.g., triglycerides. Suitable waxes include, e.g., Carnauba wax, jojoba wax, bees wax, sugar cane wax, bayberry wax, and Candellila wax, preferably having a particle diameter of at least 10 µm meter to 1000 µm meter as measured with a laser particle counter.

In addition to the carrier for the preservative composition and/or pH adjusting agent composition, such as, for example, an oil-based carrier comprising the preservative particles and/or pH adjusting agent, the composition may also include other components useful for enhancing mold, rope, spoilage yeasts and/or bacteria inhibition and/or for adhering the preservative to the dough, pan or dough-based product, such as, for example, a starch or other food grade acceptable agent which will aid adherence of the preservative and/or pH adjusting agent to the dough or pan. In other preferred embodiments, a topping and glazing may also be used in combination in the preservative and/or pH adjusting compositions described herein.

In preferred embodiments, the preservative and/or the pH adjusting agent are applied in combination with a pan release agent. In a preferred embodiment, the preservative and/or the pH adjusting agent are applied as components of a pan release composition, that is, a pan release composition which includes at least one pan release agent, and examples of such compositions and agents are well-known in the art. The pan release composition may preferably be an emulsion (water-in-oil or oil-in-water) containing a water-soluble preservative and/or water soluble pH adjusting agent together with conventional pan release agents/ingredients, such as, vegetable oil, animal fat, refined mineral oil, mono-and diglycerides, polysorbate, polyoxyethylene ester, lecithin and polyglycerol polyricinolate. In another preferred embodiment, the composition is a pan oil (trough grease) comprising a preservative and/or pH adjusting agent which is soluble or dispersible in oil together with conventional ingredients, such as, vegetable oil (e.g. soybean oil, hydrogenated soybean oil or coconut oil), a wax (e.g., carnauba wax), purified mineral oil (e.g. white mineral oil), and lecithin. The pan release composition may be formulated in analogy with U.S. Pat. Nos. 4,547,388, 5,472,482, WO 2002/071864 and WO 2002/013623.

Suitable oils for use as the oil component are animal, vegetable or synthetic oils, or oil fractions selected from the groups consisting of coconut oil, palm oil, palmkernel oil, soy bean oil, corn oil, cottonseed oil, sunflower oil, ground nut oil, safflower oil, tallow, high erucic rape oil, low erucic rape oil, rape seed oil and mixtures thereof. Suitable oils also include high oleic oils, including fractionated high oleic oils.

To obtain a more pasty consistency, the pan release agents of hard fats may be included in the pan release composition. Examples of suitable hard fats include at least partially hydrogenated coconut oil, palm oil, palm oil oleine and stearine, palm kernel oil, cottonseed oil, soy bean oil, sunflower oil, ground nut oil, olive oil safflower oil, tallow, lard, butter fat, high erucic acid rape seed oil and inter-esterified mixtures thereof.

The preservative and/or the pH adjusting agent, are included in the pan release composition in an amount effective to inhibit microbial growth, preferably mold growth, during storage of the product, when a dough based product is prepared in a pan treated with the pan release composition. Preferably, the preservative is incorporated in the pan release composition in an amount of at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 20% by weight of the pan release composition, such as, 1-50%, 2-50%, 1-30%, 3-20% or 5-15% by weight of the pan release composition. The amount of the preservative in the pan release composition may preferably correspond to 0.05-0.2% relative to the flour in the dough. In other preferred embodiments, the preservative is included in the pan release composition in an amount of at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9% relative to the flour in the dough.

The pH adjusting agent is preferably included in the pan release composition in an amount of at least 1%, such as, at least 2%, at least 3%, at least 4%, at least 5%, at least 6%, at least 7%, at least 8%, at least 9%, at least 10%, at least 15%, at least 20%, at least 25%, at least 30%, at least 35% or at least 40%, such as in the range of 1 to 40%, 1 to 40%, 2 to 40%, 3 to 40%, 4 to 40%, 5 to 40%, 6 to 40%, 7 to 40%, 8 to 40%, 9 to 40%, 10 to 40%. In other preferred embodiment, the pH adjusting agent is included in an amount of at least at least 10 to 30%, 10 to 20%, 10 to 15% or 10 to 10%, at least 10 to 30%, 10 to 20%, 10 to 15%, at least 9 to 30%, 9 to 20%, 9 to 15% or 9 to 10%, at least 8 to 30%, 8 to 20%, 8 to 15% or 8 to 10%, at least 7 to 30%, 7 to 20%, 7 to 15% or 7 to 10%, 6 to 30%, 6 to 20%, 6 to 15% or 6 to 10%, at least 5 to 30%, 5 to 20%, 5 to 15% or 5 to 10%, at least 4 to 30%, 4 to 20%, 4 to 15% or 4 to 10%, at least 3 to 30%, 3 to 20%, 3 to 15% or 3 to 10%, at least 2 to 30%, 2 to 20%, 2 to 15% or 2 to 10%, at least 1 to 30%, 1 to 20%, 1 to 15% or 1 to 10%.

The pan release composition is then applied to a pan used to cook (e.g., bake) the dough. The pan release composition may be applied to the pan in any suitable manner, such as, e.g., by coating the pan, spraying the surface of the pan or by dipping the surface of the pan in a solution comprising the pan release composition. For a typical bread pan size of 8.5 cm high, 12 cm wide and 32 cm long, the weight of the oil-based pan release agent is preferably between 0.5 to 2 g pan oil per pan. In preferred embodiments, the pan release composition is applied in an amount of 0.5 to 2 mg/cm$^2$ of the surface of the pan, more preferably, 1-2 mg/cm$^2$ of the surface of the pan, such as, e.g., 0.78 mg/cm$^2$ of the surface of the pan.

The amount, percentage or effect of the preservative and/or pH adjusting may be based on a single agent or a combination of agents.

In another preferred embodiment, the preservative and/or pH adjusting agent are applied to the pan in combination with but separately from the pan release composition, such as, for example, by spraying the pan with a pan release composition and separately by spraying the pan with a preservative composition and/or pH adjusting agent, in the desired order. In another embodiment, the pan release composition and the preservative composition and/or the pH adjusting agent can be applied to the pan simultaneously, for example, by a separate process stream or composition that is applied to the pan at the same time as the pan release composition process stream, e.g., through a spray system having two separate process streams that are sprayed simultaneously through the same spray head.

The present invention also provides pans pre-treated prior to use with a composition comprising a preservative and/or pH adjusting agent, more preferably, a pan release composition comprising these components, as described herein, in an amount effective to inhibit microbial growth (e.g., mold growth) during storage of a dough based product prepared in the pan treated with these compositions.

The preservative and/or pH adjusting agent composition, including as a pan release composition, may optionally include a flavoring agent. Examples of flavoring agents are butter flavor, bread flavor, bread crust flavor, bread crumb flavor, vanilla flavor, meat flavor, and/or flavor precursors that create similar flavors, such as, precursors which are activated during the baking process (i.e., heat activated). The flavoring agents are particularly preferred when higher concentrations of preservatives are used at the surface. In some preferred embodiments, preservative and/or pH adjusting agent are included as components (e.g., dissolved or dispersed) in a flavor composition which is applied to the surface of the dough or dough based product, as described herein.

The edible dough based products prepared by the methods of the present invention, in preferred embodiments, have a high concentration of a preservative in the surface of the dough based product, for example, in the crust of the bread. In more preferred embodiments, the dough based products have at least 0.01 to 1%, such as, at least 0.05% or at least 0.08% of the preservative on the surface of the product prepared from the dough (e.g., crust), more preferably, at least 0.1 to 2.0% of the preservative on the surface of the product. In another preferred embodiment, a bread is prepared to have at least 0.025% of a preservative in the crust of the bread one day after the bread is baked, at least 0.05% of a preservative in the crust of the bread one day after the bread is baked, or at least 0.08% of a preservative in the crust of the bread one day after the bread is baked. In yet another preferred embodiment, a bread is prepared to have at least 0.05% to 0.5% of a preservative in the crust of the bread.

The edible dough based products also preferably have a relatively low concentration (e.g., at least 0.05% to 0.5%), including no concentration (0%), of preservative inside the dough based product (e.g., the bread crumb). In a preferred embodiment, the present invention is directed to a bread having at least 0.05% of the preservative on the surface (e.g., the bread crust), more preferably at least 0.05% to 0.5% of the preservative on the surface and having less than 0.5% of a preservative in the product (e.g., the crumb), more preferably less than 0.25% of a preservative in the product, more preferably less than 0.2% of a preservative in the product, and even more preferably less than 0.1% of a preservative in the product, including 0%. When the preservative is applied to obtain such desired levels on the surface of the dough based product, the application of the preservative is preferably in combination with a pH adjusting agent, more preferably, triacetin.

The softness of the dough based product, in particular, bread products and the like, is preferably maintained by the use of one or more anti-staling agents or softners, such as, emulsifiers, hydrocolloids and enzymatic anti-staling agents. Advantageously, the combined use of an anti-staling agent and a preservative, preferably an anti-mold agent, and/or pH adjusting agent applied according to the invention can retard both microbial growth (such as, mold growth) and staling (e.g., crumb firming) of the product, and provide a product suited for long-term storage, e.g., for over two weeks, for over three weeks, or for over four weeks. As used herein, an anti-staling agent refers to a chemical, biological or enzymatic agent which can retard staling of the dough-based products, that is, which can reduce the rate deterioration of the softness of the dough based product during storage. The softness of dough based products (and the anti-staling effect of the anti-staling agent) can be evaluated empirically by the skilled test baker or measured using a texture analyzer (e.g., TAXT2), as is known in the art.

Examples of chemical anti-staling agents include polar lipids, e.g., fatty acids and their monoglyceride esters, such as, described in U.S. Pat. No. 4,160,848. In a preferred embodiment, the anti-staling agent is an anti-staling enzyme, which is preferably added to the dough prior to cooking (e.g., baking). Examples of anti-staling enzymes include, without limitation, endo-alpha-amylases, exo-alpha-amylases, such as, e.g., the exo-amylase described in U.S. Pat. No. 6,667,065 and U.S. 2004/0043109, pullulanases, glycosyltransferases, amyloglycosidases, branching enzymes (1,4-alpha-glyucan branching enzyme), 4-alpha-glucanotransferases (dextrin transferase), beta-amylases, maltogenic alpha-amylases, lipases, phospholipases, galactolipases, acyltransferases, pectate lyases, xylanases, xyloglucan endotransglycosylases, proteases, e.g., as described in WO 2003/084331, peptidases and combinations thereof.

In a preferred embodiment, the anti-staling enzyme is a beta-amylase (EC 3.2.1.2). The beta-amylase may be obtained from any suitable sources, such as, plant (e.g. soy bean) or from microbial sources (e.g. *Bacillus*).

More preferably, the anti-staling enzyme is a maltogenic alpha-amylase (EC 3.2.1.133). The maltogenic alpha-amylases is added into the dough in an amount effective to retard the staling of the product, such as, at least 500 MANU/flour, more preferably in an amount of at least 500 to 1500 MANU/flour. A maltogenic alpha-amylase may be obtained from any suitable source, such as, derived from a bacteria, such as, *Bacillus*, preferably, *B. stearothermophilus*, e.g. from strain NCIB 11837 or a variant thereof made by amino acid modification (EP 494233 B1, U.S. Pat. No. 6,162,628). The maltogenic alpha-amylase may preferably be added at a dosage of at least 500 MANU/kg flour, more preferably, at least 750 MANU/kg flour, at least 1000 MANU/kg flour (MANU unit defined in U.S. Pat. No. 6,162,628), which is hereby incorporated by reference. A preferred maltogenic alpha-amylase is NOVAMYL® (available form Novozymes A/S).

In another preferred embodiment, the anti-staling enzyme is an xylanase. The xylanase may be obtained from any suitable source, e.g. from *Bacillus*, e.g., *Bacillus subtilis*, as described in WO 2003/010923, WO 2001/066711 or WO 2000/039289, and *Aspergillus*, *Trichoderma* and *Thermomyces* as described in WO 96/32472.

Optionally, an additional enzyme may be used together with the above anti-staling enzymes, such as, e.g., a transglutaminase, a cellulytic enzyme, e.g., a cellulase, an acyltransferase, a protein disulfide isomerase, a pectinase, a pectate lyase, an oxidoreductase, e.g., a peroxidase, a laccase, a glucose oxidase, a pyranose oxidase, a hexose oxidase, a lipoxygenase, an L-amino acid oxidase or a carbohydrate oxidase. The enzyme may be of any origin, including mammalian, plant, and preferably microbial (bacterial, yeast or fungal) origin and may be obtained by techniques conventionally used in the art.

In preferred embodiments, the microbial inhibition methods of the present invention are used in combination with anti-staling agents, preferably, anti-staling enzymes, such as a maltogenic alpha-amylase, to obtain a significant extension in shelf life. In a preferred embodiment, bread having an extended shelf life is prepared by applying a preservative to the surface of a dough comprising an anti-staling enzyme. In a more preferred embodiment, a bread having an extended shelf life is prepared by applying a preservative in an amount of at least 0.1 milligrams active ingredient per cm$^2$, more preferably, in the range of 0.01 to 5 milligrams/cm$^2$, to the outer surface of a dough comprising maltogenic alpha-amylase in an effective amount, e.g. more 100 MANU/kg flour, more than 500 MANU/kg flour, such as, between 100 to 1500 MANU/kg flour.

Although the present invention is applicable to producing dough products having any desired shelf life, e.g., a shelf life of 7 to 19 days, in a preferred embodiment, the prevent invention is also directed to commercially acceptable dough based products that are characterized by having a longer shelf life then dough based products prepared by other methods, e.g., a shelf life of above 20 days, above, 21 days, above 22 days, above 23 days, above 24 days, above 25 days, above 26 days, above 27 days, above 28 days, above 29 days, above 30 days. above 40 days, above 50 days, above 60 days, above 70 days, above 80 days, or above 90 days.

In a preferred embodiment, the present invention relates to a method for distributing baked products, comprising a) producing at a production facility a baked product having a shelf life of at least about 22 days; b) transporting the baked product from the production facility to a point of sale location; c) displaying the baked product for sale at the point of sale location, preferably, a plurality of point of sale locations; and wherein the time for achieving a)-c) is for a period of at least the shelf life of the product. In preferred embodiments, the shelf life of the product is at least about 23 days, at least about 24 days, at least about 25 days, at least about 26 days, at least about 27 days, at least about 28 days, at least about 29 days, at least about 30 days, at least about 40 days, at least about 50 days, at least about 60 days, at least about 70 days, at least about 80 days, and at least about 90 days. In other preferred embodiments, the time for achieving a)-c) is for a period of at least 1 day, 2 days or 3 days prior to the expiration of the shelf life of the product. In other preferred embodiments, the time for achieving b) is up to at least 11 days, 10 days, 9 days, 8 days, 7 days, 6 days, 5 days, 4 days, 3 days, 2 days or 1 day prior to the expiration of the shelf life of the product.

In some preferred embodiments, the baked product is displayed for sale at the point of sale location for a period of 1 day, 2 days, 3 days, 4 days, 5 days, 6 days, 7 days, 8 days, 9 days, 10 days, 11 days, 12 days, 13 days, 14 days, 15, days, 16 days, 17 days before the expiration of the shelf life. In other preferred embodiments, the baked product is distributed to the point of sale location at least 1 day, 2 days, 3, days, 4 days, 5 days, 6 days, 7 days, 8 days, 9 days, 10 days, 11 days, 12 days, 13 days, 14 days, 15 days, 16 days, 17 days, 18, days, 19 days, 20 days, 21 days, 22 days prior to the expiration of the shelf life of the product, alternatively, at day 3, 4, 5, 6, 7, 8, 9, 10, 11, 12, 13, 14, 15, 16, 17, 18, 19, 20, 21 or 22 following production. In other preferred embodiments, the baked product is displayed at the point of sale location at day 3, 4, 5, 6, 7, 8, 9, 10, 11, 12, 13, 14, 15, 16, 17, 18, 19, 20, 21, or 22 following production.

The baked products may be transported from the production facility to the point of sale location through at least one distributor, such as, by trucking the product.

Another preferred embodiment relates to a method for distributing baked products, comprising a) producing at a production facility a baked product having a shelf life of at least about 22 days; b) transporting the baked product from the production facility to a plurality of point of sale locations; wherein the plurality of point of sale locations comprises at least one point of sale location in which the baked goods are delivered on or after day 18 following production; c) displaying the baked product for sale at the plurality of point of sale locations for a period up to the shelf life of the baked product. In preferred embodiments, the baked product has a shelf life of at least is at least about 23 days, at least about 24 days, at least about 25 days, at least about 26 days, at least about 27 days, at least about 28 days, at least about 29 days, at least about 30 days, at least about 40 days, at least about 50 days, at least about 60 days, at least about 70 days, at least about 80 days, and at least about 90 days.

Another preferred embodiment relates to a method for distributing baked products comprising a) producing at a production facility a baked product having a shelf life of about 23 days; b) transporting the baked product from the production facility to a plurality of point of sale locations; wherein the transporting may occur during day 2-23 following production; c) displaying the baked product for sale at the plurality of point of sale locations for a period up to the shelf life. Preferably, the baked product has a shelf life of at least is at least about 24 days, at least about 25 days, at least about 26 days, at least about 27 days, at least about 28 days, at least about 29 days, at least about 30 days, at least about 40 days, at least about 50 days, at least about 60 days, at least about 70 days, at least about 80 days, and at least about 90 days.

Another preferred embodiment relates to a method for distributing baked products, comprising a) producing at a production facility a baked product having a shelf life of at least about 30 days; b) transporting the baked good from the production facility to a plurality of point of sale locations; and c) displaying the baked good at the point of sale location for sale; wherein the transportation and display of the baked product is for a period of up to the shelf life of the product.

Yet another preferred embodiment relates to a method for distributing baked products, comprising: a) receiving orders for a baked product from a plurality of purchasers; wherein for at least one purchaser of the baked product, the baked product will not be delivered until at least about day 18 following production of the baked product; b) producing at a central production facility a baked product batch to supply the plurality of purchasers, wherein the baked product has a shelf life of at least about 23 days; c) completing the orders by delivering the requested quantity of backed product to the plurality of purchasers. In preferred embodiments, the baked product has a shelf life of is at least about 23 days, at least about 24 days, at least about 25 days, at least about 26 days, at least about 27 days, at least about 28 days, at least about 29 days, at least about 30 days, at least about 40 days, at least about 50 days, at least about 60 days, at least about 70 days, at least about 80 days, and at least about 90 days.

A further preferred embodiment relates to a method for distributing baked products, comprising: a) producing at a production facility a baked product having a shelf life of at least about 22 days; b) distributing the baked product to a plurality of point of sale locations for display of the baked product for purchase and consumption; and c) displaying the baked products for purchase; wherein the period available for displaying the baked products for purchase begins at least five days prior to expiration of the shelf life of the baked product. In preferred embodiments, the baked product has a shelf life of at least about 23 days, about 24 days, about 25 days, about 26 days, about 27 days, about 28 days, about 29 days or about 30 days. In other preferred embodiments, the period available for displaying the baked products for purchase begins at least 6 days, 7 days, 8 days, 9 days, 10 days, 11 days, 12 days, 13 days, or 14 days prior to expiration of the shelf life of the baked product.

EXAMPLES

Example 1

Pan Release Emulsion

| Two pan-release compositions were formulated as follows: | | |
| --- | --- | --- |
| Water | 50.0% | 47.0% |
| Sunflower oil | 39.2% | 36.5% |
| Ca propionate | 7.1% | 13.0% |
| Emulsifier | 3.7% | 3.5% |
| | 100% | 100% |

The emulsifier is thermally oxidized and polymerized soyaoil emulsifier (Product name, Palsgaard 4104, available form Palsagaard Industry A/S, Juelsminde, Denmark).

1 g to 2 g of the release agent is applied per pan. The bread baked in that pan has a weight of approximately 450 g.

Example 2

White Bread

Bread was baked according to the following sponge & dough method.

| Recipe | % on flour basis |
| --- | --- |
| Sponge | |
| Soya oil | 2.5 |
| SSL | 0.38 |
| Yeast | 5 |
| Wheat flour | 60 |
| Calcium propionate | 0.0 or 0.1% relative to the amount of flour in the sponge |
| Water | 62 |
| Dough | |
| Ascorbic acid | optimized for each flour |
| ADA | 20 ppm |
| Salt | 2 |
| Glucose | 7 (dry substance) |
| Water | optimized for each flour |
| Wheat flour | 40 |
| Calcium propionate | 0.0, 0.15, 0.275 or 0.40% relative to the amount of flour in the dough |
| Novamyl ®, product of Novozymes A/S 10.000 BG: | 900 MANU |
| hydrated distilled double strength monoglycerides | 0.5% |

Sponge

Scaling of ingredients, addition of yeast, water, flour, SSL and oil into mixer bowl. Mixing 90 rpm for 1 minutes, 150 rpm for 4 minutes. The sponge is weighed, the temperature is measured and the sponge is placed in a bowl~fermentation 3 hours at 27° C., 86% RH.

Dough

Addition of ingredients and the sponge into the mixer bowl. The sponge and ingredients are mixed together 90 rpm for 9 minutes. The temperature is measured, and the dough is scaled into smaller pieces of 430 g each. The dough rests on the table for 10 minutes. Doughs are sheeted, molded and placed lidded pans.with and without addition of calcium propionate to pan release oil.

Preparation of Calcium Propionate Containing Pan Release Oil:

10 g of calcium propionate was suspended on approx 10 ml water and 100 ml Acartis alube F-6 pan release oil was added. Approx 1.5 g of the oil was added to the pan.

Fermentation for 55 minutes at 42° C. and 86% RH. Bread is baked at 224° C. for 15 minutes.

Result

It was observed that higher calcium propionate levels in the dough tended to yield loaves with poorer crumb structure. A subjective flavor evaluation showed that the flavor seemed to worsen with increased calcium propionate levels in the dough piece and was independent of the addition in the pan oil.

The loaves were stored for 30 days after baking. No mold growth was observed on any loaves until day 12 after baking. Mold growth was found to occur later in loaves treated with calcium propionate in the pan oil than in controls made without calcium propionate in the pan oil but with the same calcium propionate dosage in the dough and sponge.

Example 3

Pan Oil

A mixture was made of 90 parts by weight of sunflower oil and 10 parts of glycerol tri propionate. It was found that the two liquids were fully miscible and the mixture was clear.

A baking pan was treated with the mixture. Dough was filled in and baked to make bread. After storage for 12 days, the result showed that the bread baked in the treated tin was not molding whereas bread baked in the normal tin showed mold.

Example 4

Measurement of Propionic Acid in the Crust

Bread was baked in lidded pans according to the following sponge & dough method.

| Recipe | % on flour basis |
| --- | --- |
| Sponge | |
| Soya oil | 2.5 |
| SSL | 0.38 |
| Yeast | 5 |
| Wheat flour | 60 |
| Water | 62 |
| Dough | |
| Ascorbic acid | optimized for each flour |
| ADA | 20 ppm |
| Salt | 2 |
| Glucose | 7 (dry substance) |
| Water | optimized for each flour |
| Wheat flour | 40 |
| Calcium propionate | 0.25 |
| Novamyl ®, product of Novozymes A/S 10.000 BG: | 900 MANU |

Sponge

Scaling of ingredients, addition of yeast, water, flour, SSL and oil into mixer bowl. Mixing 90 rpm for 1 minutes, 150 rpm for 4 minutes. The sponge is weighed, the temperature is measured and the sponge is placed in a bowl~fermentation 3 hours at 27° C., 86% RH.

Dough

Addition of ingredients and the sponge into the mixer bowl. The sponge and ingredients are mixed together 90 rpm for 9 minutes. The temperature is measured, and the dough is scaled into smaller pieces of 435 g each. The dough rests on the table for 10 minutes. Doughs are sheeted, molded and placed lidded pans with and without addition of calcium propionate to the pan release oil.

Preparation of Calcium Propionate Containing Pan Release Oil:

15 g of calcium propionate was suspended on approx 15 ml water and 50 ml Acartis alube F-6 pan release oil was added. The resulting pan release oil contains 18.7% (w/w) calcium propionate. Approx 1.5 g of the oil was added to the pan.

Fermentation for 55 minutes at 42° C. and 86% RH. Bread was baked at 200° C. for 22 minutes.

Propionic Acid and Propionate was Measured in the Crust by the Following Method:

The outer layer of the crust (0.5-1 mm) was removed by a kitchen grater. A total of 4 g crust was extracted from each bread followed by the propionic acid measurement following the method for extraction and determination of propionic acid described by M J Scotter et al (Food Additives and contaminants (1994) 11: 295-300). The amount of propionic acid was measured relative to a propionic standard, and the results are expressed as gram calcium propionate per kg of bread.

The results were as follows:

| Bread With Calcium Propionate In The Pan Release Mix: | |
| --- | --- |
| CaPro in the crust: | 2.28 g/kg (mean of 3 measurements) |
| CaPro in the crumb: | 1.00 g/kg (mean of 2 measurements) |
| Bread Without Calcium Propionate In The Pan Release Mix: | |
| CaPro in the crust: | 0.06 g/kg (mean of three measurements) |

It is seen that only a very low amount of propionic acid is measured in the crust from bread baked without calcium propionate in the pan release oil—this is likely because of extensive evaporation of propionic acid from the crust.

A higher amount of calcium propionate is measured in the crust of the bread when calcium propionate is added into the pan release oil, also compared to the amount in the crumb.

Example 5

Water-In-Oil Emulsion Mold-Inhibitor Composition

A thermally oxidized and polymerized soyaoil emulsifier (Product name, Palsgaard 4104, available from Palsgaard Industry A/S, Juelsminde, Denmark) is placed in a beaker and stirred.

Add warm water (50-60° C.) and the desired amount of an anti-preservative (e.g., calcium propionate). The solution is poured slowly at first and then quickly to produce an oil/emulsifier blend while stirring at maximum speed. Stir for two minutes after the whole water phase is added.

Homogenize the composition for 2-3 minutes, although the homogenization time depends on the ratio between the size of the stirrer and the dimension of the beaker.

Example 6

Finely Dispersed Preservative Agents

The concentration of the preservative calcium propionate in the crust of bread after treatment with a composition comprising finely dispersed calcium propionate preservative particles according to the present invention was evaluated.

Breads were baked in open pans according to the sponge and dough standard procedure and with addition of 0.10% (relative to the amount of flour) Ca-propionate in the sponge and 0.10% Ca-propionate in the dough. 900 MANU Novamyl/kg was also added.

|            | Dough |     |     |     |     |
|------------|-------|-----|-----|-----|-----|
| Pan oils   | 1     | 2   | 3   | 4   | 5   |
| Superfine Ca-propionate | 0 | 15% | 15% | 15% | |
| Triacetin (TA) | 0 | 0 | 10% | 20% | |
| K-sorbate  |       |     |     |     | 15% |

The pan oils are based on (Trennaktiv PR 100 pan oil from Dubor). Ca-propionate was a superfine quality (FCC, food chemical codex) and potassium sorbate was a standard quality. Sufficient pan oil was added to ensure a uniform layer—the actual amount of pan oil was recorded (by the delta weight of the pans). The outer layer of the crust (0.5-1 mm) was removed by a grater. A total of 5 g crust was extracted from each bread followed by the propionic acid measurement using the method for extraction and determination of propionic acid described by M J Scotter et al (Food Additives and contaminants (1994) 11: 295-300). The amount of propionic acid was measured relative to a propionic acid standard, and the results are expressed as a calcium propionate per kg of bread.

In dough 5, the amount of sorbic acid was measured following the same extraction and analysis procedure, the results are expressed in gram of potassium sorbate per kg bread.

Propionic acid was measured one day after baking from the sides and bottom of the crust (from 3 breads) and from the crumb (from 2 breads). Furthermore, propionic acid was measured from the top of the crust of bread 3. pH was measured after suspension in 10 times water (w/w) on the same crust/crumb samples as were used for extraction of propionic acid.

The results (mean values) of the propionic acid and sorbic acid measurements (in g calcium propionate/kg bread or g potassium sorbate/kg bread) are given in the table below.

|   | Dough 1 reference | Dough 2 15% CaP | Dough 3 15% CaP 10% TA | Dough 4 15% CaP 15% TA | Dough 4 15% K-Sorbate |
|---|---|---|---|---|---|
| Ca—P in crust (sides and bottom) | 0.09 | 0.91 | 1.10 | 1.10 | — |
| Ca—P in crust (top) | — | — | 0.12 | — | — |
| Ca—P in crumb | 0.82 | 0.76 | 0.76 | 0.88 | — |
| k-sorbate in crust (sides and bottom) | 0 | — | — | — | 0.32 |
| K-sorbate in the crumb | 0 | — | — | — | 0.05 |

It is observed that the pan oil with calcium propionate or potassium sorbate significantly increased the amount of preservative in the crust which has been in contact with the pan.

Example 7

Surface Treatment with a pH Adjusting Agent

An experiment was performed to determine the effect of the combination of a pH adjusting agent (triacetin) and a preservative (calcium propionate) to the surface of a dough based product. Bread was baked according to the following sponge & dough method:

Mixing: Sponge; 3 min. Slow and 2 min fast in the Spiral mixer 24° C., Sponge time 3 hours at room temperature Dough; 5.5 min. high speed in the Morton Z-blade mixer. Scale one dough piece and put the rest of the dough through the meat mill.

| Ingredients | Sponge % | Dough % |
|---|---|---|
| USA flour | 58 | 42 |
| Water | 35 | 22 |
| Fermipan Brown | 2 | 1 |
| Ascorbic acid | 0.0025 | — |
| Salt | — | 2 |
| HFCS (73% solids) | — | 15 |
| Oil | — | 3 |
| SSL | 0.5 | — |
| Emulsifier | 0.5 | — |
| Calcium propionate | 0.1 | — |
| Rotox | — | 0.05 |
| Softase | — | 0.5 |

Dough temperature: 27° C.
Dough weight: 400 g. Round up softly by hand.
Proofing time: 6 min. at room temp.
Moulding: With the Mono Emulsifier Walls; 4 Pressure belt; 7 Conductors; 9;
Final Proofing time: 70 min. at 40° C. and 80% R.H.;
Baking: 21 min. at Top 200° Floor 250° C.

Various concentrations of a preservative (calcium propionate), with and without the pH adjusting agent (triacetin), were included as components in a pan oil release composition which was sprayed onto a baking pan, using a Preval sprayer (2.1 oz contents under pressure) with a 150 ml bottle for the release agent. 0.1% of the preservative calcium propionate was also added into the sponge of the dough. The calcium propionate was sieved with the release agent before use with a 200 micron sieve. pH measurements were taken with 7 day old bread, stored in closed plastic bags following baking, by slicing 1.5 to 2 millimeters from the bottom and sides of the crust, with a total of 25 grams (or approximately 5% of the total bread weight). The pH measurements were performed by milling the 25 grams of the bread crust. 15 grams of the bread crust was mixed with 135 grams of neutral water and the pH was measured using a pH meter (PHX 1495). As shown below, the addition of the pH adjusting agent compensated for the increase in pH in the surface of the dough product caused by the preservative.

| Trial 1 | Trail 2 | Trial 3 | Trial 4 | Trial 5 | Trial 6 |
|---|---|---|---|---|---|
| (0% calcium propionate and 0% triacetin) | (10% calcium propionate and 0% triacetin) | (15% calcium propionate and 0% triacetin) | (15% calcium propionate and 10% triacetin) | (15% calcium propionate and 20% triacetin) | (10% calcium propionate and 30% triacetin) |
| pH: 5.49 | pH: 5.7 | pH: 5.83 | pH: 5.75 | pH: 5.66 | pH: 5.42 |

Example 8

In this experiment, the level of high fructose corn syrup normally used in bread commonly prepared for the U.S. (15% to 20%) market was reduced significantly (5%) in order to further observe the anti-mold effectiveness of the present invention. In particular, the bread contained 0.1% of calcium propionate in the dough with 5% high fructose corn syrup.

The bread was prepared by the following recipe

| Ingredients | Sponge grams | Dough grams |
|---|---|---|
| USA flour | 910 | 390 |
| Water | 507 | 260 |
| Ascorbic Acid | 0.034 | — |
| Compressed yeast | 26 | — |
| Ammonium sulphate | 0.6 | — |
| Oil | 52 | — |
| SSL | 1.62 | — |
| Fermipan Brown (dried yeast, DSM, Neatherlands) | 19.5 | 6.5 |
| HFCS | — | 91 |
| Rotox (oxidant) (ICS) | — | 0.81 |
| Softase (softner) (ICS) | — | 6.5 |

Propionate 1.4 grams in sponge (= 0.1% on flour weight).

Processing:

Mixing: Sponge; 3 min. Slow and 2 min. Fast in the Spiral mixer 24° C.

Sponge time, 2.5-3 hours at room temperature

Dough: ½ min., slow speed in Mc. Duffy mixer, 8 ½ min. high speed in Mc. Duffy mixer Dough temp: 26° C.

Rest time: 2 min. at room temp.

Dough wt. 420 g

To round up softly by hand.

Proofing time: 6 min. at room temp.

Molding: With the "Mono" walls, 3.5 pressue belt, 6.5 conductors, 9

Final Proofing time: variable (normally 75 min. at 40° C.) And 80% R.H.

Baking: 20 min. @ 210° C. (top), 230° C. bottom

The dough for the bread samples were then treated prior to baking with the following compositions:
1: Control: no surface treatment with a preservative (calcium propionate (CP) or potassium sorbate (PS)) or a pH adjusting agent (triacetin (TA))
2: 10% CP+30% TA
3: 10% PS
4: 10% PS+15% TA
5: 10% PS+30% TA
6: 3% PS
7: 3% PS+15% TA The bread samples were then evaluated at days 8, 9, 10, 11, 12, 13, 14 and 15 post-baking under the same storage conditions for mold formation and rated as follows:

| Rating | Mold Level |
|---|---|
| 10 | No Mold |
| 9 | there might be 1 spot in 4 loaves, but difficult to see |
| 8 | 1 spot on 1 loaf out of 4 |
| 7 | 2 spots on 1 loaf or 1 spot on 2 loaves |
| 6 | 3 spots total |
| 5 | 4 spots in max 3 loaves |
| 4 | 4 spots on 4 loaves or 5 to 7 spots in 1 to 4 loaves |
| 3 | 8 to 11 spots |
| 2 | 11 to 15 spots |
| 1 | more than 15 spots |

The results were as follows:

| | Day | | | | | | | |
|---|---|---|---|---|---|---|---|---|
| | 8 | 9 | 10 | 11 | 12 | 13 | 14 | 15 |
| Control | 10 | 9 | 7 | 6 | 5 | 3 | 1 | 1 |
| 10% CP + 30% TA | 10 | 10 | 10 | 10 | 10 | 9 | 8 | 7 |
| 10% PS | 10 | 10 | 10 | 10 | 9 | 8 | 6 | 6 |
| 10% PS + 15% TA | 10 | 10 | 10 | 10 | 10 | 9 | 8 | 7 |
| 10% PS + 30% TA | 10 | 10 | 10 | 10 | 10 | 10 | 9 | 8 |
| 3% PS | 10 | 10 | 8 | 7 | 6 | 5 | 3 | 1 |
| 3% PS + 15% TA | 10 | 10 | 10 | 10 | 8 | 8 | 7 | 6 |

As is clearly shown above, the surface treatment of the dough prior to baking with a preservative significantly improved the mold resistance of the bread when compared to the control, however, the combination of the preservative and the pH adjusting agent (triacetin) surface treatment was significantly more effective than the surface treatment with a preservative alone.

Example 9

Breads were prepared and evaluated at days 8, 9, 10, 11, 12, 13, 14 and 15 post-baking for mold formation as described in Example 8, with the following surface application of the dough prior to baking:
1: Control: no surface treatment with a preservative (calcium propionate (CP) or citric acid (CA) or mono calcium propionate (MCP) or a pH adjusting agent (triacetin (TA))
2: 10% CP+30% TA
3: 10% CP+10% TA
4: 10% CP+5% CA
5: 10% CP/5CA/10TA
6: 15% CP+10% MCP

| | Day | | | | | | | |
|---|---|---|---|---|---|---|---|---|
| | 8 | 9 | 10 | 11 | 12 | 13 | 14 | 15 |
| Control | 10 | 9 | 7 | 6 | 5 | 3 | 1 | 1 |
| 10% CP 30% TA | 10 | 10 | 10 | 10 | 10 | 9 | 8 | 7 |
| 10% CP 10% CA | 10 | 10 | 10 | 10 | 8 | 7 | 6 | 4 |
| 10% CP 5% CA | 10 | 10 | 9 | 8 | 7 | 6 | 5 | 4 |
| 10% CP 5% CA 10% TA | 10 | 10 | 10 | 9 | 8 | 7 | 6 | 5 |
| 15% CP 10% MCP | 10 | 10 | 8 | 7 | 6 | 6 | 3 | 1 |

As is clearly shown above, the surface treatment of the dough prior to baking with various combinations of preservatives and/or a pH adjusting agent (triacetin) improved the mold resistance of the bread, however, the surface treatment with the combination of a preservative and a pH adjusting agent triacetin was the most effective.

Example 10

Breads were prepared and evaluated at days 8, 9, 10, 11, 12, 13, 14 and 15 post-baking for mold formation as described in Example 8, with the following surface application of the dough prior to baking:

Breads were prepared and evaluated at days 8, 9, 10, 11, 12, 13, 14 and 15 post-baking for mold formation as describes in Example 8, with the following surface application of the dough prior to baking:

1: Control: no surface treatment with a preservative (calcium propionate (CP)) or a pH adjusting agent (triacetin (TA))
2: 10% CP+30% TA
3: 5% CP+15% TA
4: 15% CP+15% TA
5: 15% CP

|  | Day | | | | | | | |
|---|---|---|---|---|---|---|---|---|
|  | 8 | 9 | 10 | 11 | 12 | 13 | 14 | 15 |
| control | 10 | 9 | 7 | 6 | 5 | 3 | 1 | 1 |
| 10% CP 30% TA | 10 | 10 | 10 | 10 | 10 | 9 | 8 | 7 |
| 5% CP 15% TA | 10 | 10 | 10 | 9 | 8 | 7 | 6 | 4 |
| 15% CP 15% TA | 10 | 10 | 10 | 10 | 9 | 8 | 6 | 5 |
| 15% CP | 10 | 10 | 9 | 8 | 7 | 6 | 5 | 3 |

Again, as is clearly shown above, the surface treatment of the dough prior to baking with a preservative and the pH adjusting agent (triacetin) significantly improved the mold resistance of the bread.

Example 11

Pan Release Composition

A pan release composition was prepared as follows: Dubor Trennaktiv PR 100, an oil for all baking trays and tins that contain wax and lecithin was mixed at room temperature with fine particle size Ca-propionate and triacetin in different ratios using a lab stirrer to obtain a release composition that was than used to grease the baking pan. The dough is than deposited in the pan and baked.

Example 12

Pan Release Composition

A pan release composition may be prepared as follows: Blend carnauba wax and lecithin with a liquid oil at a temperature above the melting point of the wax and after a clear solution is reached the mixture is cooled down while stirring till room temperature is reached. The mixture can than be used to prepare preservative compositions, as described herein.

The invention claimed is:

1. A process for preparing bread, comprising:
   (a) treating a surface of a dough which is in contact with a pan used to bake said dough with (i) at least one preservative in an amount effective to inhibit mold growth on the surface of bread prepared from the dough and (ii) at least one pH adjusting agent in an amount effective to improve the activity of the at least one preservative and/or inhibit microbial growth on the surface of bread prepared from the dough, wherein the at least one pH adjusting agent is added in an amount effective to lower the pH of the surface of the dough and/or bread prepared from the dough by a factor of at least 0.01 pH units and wherein the at least one preservative is added in amount to obtain bread in which the first microbial spoilage growth appears on the bread at least one day later than bread prepared under identical conditions without said step (a); and
   (b) baking the dough to form the bread; wherein the treating is done prior to or during baking.

2. The process of claim 1, wherein the pH adjusting agent is solid or liquid agent which is converted to a gas or vapor during the baking or a heat activated pH adjusting substance which is broken down at baking temperatures into one or more components which will cause a reduction in pH of the treated surface.

3. The process of claim 1, wherein the at least one pH adjusting agent is selected from the group consisting of triacetin, monocalcium phosphate, acetic acid, citric acid, pyrophosphate, sodium phosphate, potassium phosphate, and combinations thereof.

4. The process of claim 1, wherein the at least one pH adjusting agent is triacetin.

5. The process of claim 1, wherein the at least one preservative is selected from the group consisting of sodium benzoate, calcium benzoate, potassium benzoate, sodium diacetate, paraben, niacin, calcium acetate, calcium diacetate, sodium sorbate, calcium sorbate, potassium sorbate, sodium propionate, calcium propionate, potassium propionate, sorbic acid, acetic acid, nisin, natamycin and combinations thereof.

6. The process of claim 1, wherein the at least one preservative is calcium propionate.

7. The process of claim 1, wherein the at least one preservative is calcium propionate, potassium sorbate or a combination thereof.

8. The process of claim 1, wherein the (i) at least one preservative is calcium propionate, potassium sorbate or a combination thereof and the (ii) at least one pH adjusting agent is triacetin.

9. The process of claim 1, wherein the treating comprises treating a dough-contacting surface of a baking pan used to bake the dough to from the bread.

10. The process of claim 9, wherein the dough-contacting surface of the baking pan is treated prior to filling the dough into the baking pan.

11. The process of claim 1, wherein the dough comprises an anti-staling agent.

12. The process of claim 1, wherein the dough comprises an anti-staling agent selected from the group consisting of an emulsifier, hydrocolloids, alpha-amylase, pullulanase, xylanase, beta-amylase, maltogenic alpha-amylase, lipases, phospholipases, hexose oxidase, glucose oxidase and combinations thereof.

13. The process of claim 1, wherein the bread is selected from the group consisting of sandwich bread, buns, rolls and bagels.

14. The process of claim 1, wherein the bread is selected from the group consisting of white bread, wheat bread, whole-meal bread, low-carb bread, multi-grain bread, dark bread, brown bread and rye bread.

15. The process of claim 1, wherein the at least one preservative is in the form of an aqueous composition.

16. The process of claim 1, wherein the at least one preservative is in the form of an oil-based composition.

17. The process of claim 16, wherein the oil-based composition is a water-in-oil emulsion.

18. The process of claim 16, wherein the oil-based composition is an oil-in-water emulsion.

19. The process of claim 16, wherein the oil-based composition is a mixture of oils, waxes and lecithins.

20. The process of claim 16, wherein the at least one preservative is suspended in the composition in the form of very fine preservative particles having a mean particle size below 200 μm.

21. The process of claim 16, wherein the at least one preservative is suspended in the composition in the form of very fine preservative particles having a mean particle size in the range between 10 μm and 200 μm.

22. The process of claim 16, wherein the composition further comprises fatty particles and/or wax particles.

23. The process of claim 1, wherein the at least one pH adjusting agent is in the form of an aqueous composition.

24. The process of claim 1, wherein the at least one pH adjusting agent is in the form of an oil-based composition.

25. The process of claim 24, wherein the oil-based composition is a water-in-oil emulsion.

26. The process of claim 24, wherein the oil-based composition is an oil-in-water emulsion.

27. The process of claim 24, wherein the oil-based composition is a mixture of oils, waxes and lecithins.

28. The process of claim 24, wherein the at least one pH adjusting agent is suspended in the composition in the form of very fine particles having a mean particle size below 200 μm.

29. The process of claim 24, wherein the at least one pH adjusting agent is suspended in the composition in the form of very fine particles having a mean particle size in the range between 10 μm and 200 μm.

30. The process of claim 24, wherein the composition further comprises fatty particles and/or wax particles.

31. The process of claim 1, wherein the at least one preservative and the at least one pH adjusting agent are components of the same composition.

32. The process of claim 31, wherein the composition is an aqueous composition.

33. The process of claim 31, wherein the composition is an oil-based composition.

34. The process of claim 31, wherein the composition is a water-in-oil emulsion.

35. The process of claim 31, wherein the composition is an oil-in-water emulsion.

36. The process of claim 31, wherein the composition is a mixture of oils, waxes and lecithins.

37. The process of claim 31, wherein the at least one preservative and the at least one pH adjusting agent are suspended in the composition in the form of very fine particles having a mean particle size below 200 μm.

38. The process of claim 31, wherein the at least one preservative and the at least one pH adjusting agent are suspended in the composition in the form of very fine particles having a mean particle size in the range between 10 μm and 200 μm.

39. The process of claim 31, wherein the composition further comprises fatty particles and/or wax particles.

40. The process of claim 1, wherein the surface of the dough is treated simultaneously with the at least one preservative and the at least one pH adjusting agent.

41. The process of claim 1, wherein the surface of the dough is treated sequentially with the at least one preservative and the at least one pH adjusting agent, first with the at least one preservative followed by the at least one pH adjusting agent or first with the at least one pH adjusting agent followed by the at least one preservative.

42. The process of claim 1, wherein the pH adjusting agent is included in an amount effective to lower the pH of the surface of the dough and/or bread by a factor of at least 0.05 pH units.

43. The process of claim 1, wherein the at least one preservative is a component of a pan release composition comprising at least one pan release agent, and the treating comprises treating the surface of a pan used in baking the dough with said pan release composition.

44. The process of claim 1, wherein the at least pH adjusting agent is a component of a pan release composition comprising at least one pan release agent, and the treating comprises treating the surface of a pan used in baking the dough with said pan release composition.

45. The process of claim 1, wherein the at least one preservative and the at least one pH adjusting agent are components of a pan release composition comprising at least one pan release agent, and the treating comprises treating the surface of a pan used in baking the dough with said pan release composition.

46. The process of claim 1, wherein the treating comprises (i) treating a pan used to bake the dough with at least one preservative and at least one pH adjusting agent and (ii) treating the surface of the dough which is not in contact with the surface of the treated pan with at least one preservative and/or at least one pH adjusting agent.

47. The process of claim 1, wherein the at least one preservative is applied in an amount to obtain at least 0.05% of the preservative on the surface of the baked product.

48. The process of claim 1, wherein the at least one preservative is applied in an amount to obtain at least 0.05% to 0.5% of the preservative on the surface of the baked product.

49. The process of claim 43, wherein the at least one preservative is included in the pan release composition in an amount of at least 1% by weight of the pan release composition.

50. The process of claim 43, wherein the at least one preservative is included in the pan release composition in an amount of at least 3% by weight of the pan release composition.

51. The process of claim 43, wherein the at least one preservative is included in the pan release composition in an amount of at least 4% by weight of the pan release composition.

52. The process of claim 43, wherein the at least one preservative is included in the pan release composition in an amount of at least 5% by weight of the pan release composition.

53. The process of claim 43, wherein the at least one preservative is included in the pan release composition in an amount of at least 1% to 20% by weight of the pan release composition.

54. The process of claim 43, wherein the at least one preservative is included in the pan release composition in an amount of at least 3% to 20% by weight of the pan release composition.

55. The process of claim 43 wherein the at least one preservative is included in the pan release composition in an amount of at least 5% to 15% by weight of the pan release composition.

56. The process of claim 1, wherein the treating comprises coating the surface in an amount of least 0.05 to 1 mg of preservative per $cm^2$ of the surface of the dough and/or bread.

57. The process of claim 1, wherein at least one preservative is added into the dough prior to baking.

58. The process of claim 1, wherein at least one preservative is added into the dough prior to baking in an amount of less than 0.5% by weight of the flour in the dough.

59. The process of claim 1, wherein at least one preservative is added into the dough prior to baking in an amount of less than 1% by weight of the flour in the dough.

60. The process of claim 1, wherein at least one preservative is added into the dough prior to baking in an amount of 0.5% to 0.05% by weight of the flour in the dough.

61. The process of claim 1, wherein at least one preservative is applied to the surface of the bread after baking.

62. The process of claim 1, wherein at least one pH adjusting agent is applied to the surface of the bread after baking.

63. The process of claim 1, wherein the dough comprises a maltogenic alpha-amylase in an amount of at least 500 MANU/kg flour.

64. The process of claim 1, wherein the dough comprises a maltogenic alpha-amylase in an amount of at least 500 to 1500 MANU/kg flour.

65. The process of claim 43, wherein the pan release composition is an oil-based, oil-in-water based or in water-in-oil based composition.

66. The process of claim 43, wherein the pan release composition is an oil-based, oil-in-water based or in water-in-oil based composition and wherein the oil in the pan release composition is an animal oil, vegetable oil or synthetic oil.

67. The process of claim 43, wherein the pan release composition is an oil-based, oil-in-water based or in water-in-oil based composition and wherein the oil in the pan release composition is an oil fraction selected from the groups consisting of coconut oil, palm oil, palmkernel oil, soy bean oil, corn oil, cottonseed oil, sunflower oil, ground nut oil, safflower oil, tallow, high erucic rape oil, rape seed oil and mixtures thereof.

68. The process of claim 43, wherein the pan release composition comprises at least one ingredient selected from the group consisting of water, vegetable oil, animal fat, refined mineral oil, mono-and diglycerides, polysorbate, polyoxyethylene ester, lecithin and polyglycerol polyricinolate.

69. The process of claim 43, wherein the at least one preservative is suspended in the pan oil composition.

70. The process of claim 44, wherein the at least one pH adjusting agent is suspended in the pan oil composition.

71. The process of claim 1, wherein the process further comprises treating the prepared bread with an edible glue comprising at least one preservative and/or pH adjusting agent.

72. The process of claim 71, wherein the edible glue is a starch based glue.

73. The process of claim 1, wherein the process further comprises treating the dough with at least one flavoring agent and/or at least one flavor precursor.

74. The process of claim 73, wherein the at least one flavoring agent is selected from the group consisting of a butter flavor, bread flavor, bread crust flavor, bread crumb flavor, vanilla flavor, and meat flavor.

75. The process of claim 15, wherein the composition further comprises at least one flavoring agent and/or at least one flavor precursor.

76. The process of claims 15, wherein the composition further comprises at least one flavoring agent selected from the group consisting of a butter flavor, bread flavor, bread crust flavor, bread crumb flavor, vanilla flavor, and meat flavor.

77. The process of claim 43, wherein the composition further comprises at least one flavoring agent and/or at least one flavor precursor.

78. The process of claims 43, wherein the composition further comprises at least one flavoring agent selected from the group consisting of a butter flavor, bread flavor, bread crust flavor, bread crumb flavor, vanilla flavor, and meat flavor.

79. A pan release composition comprising:
(a) a pan release agent;
(b) at least one preservative in an amount effective to inhibit mold growth on the surface of a dough based product prepared in a pan treated with the pan release composition; and wherein the at least one preservative is added in amount to obtain bread in which the first microbial spoilage growth appears on the bread at least one day later than bread prepared under identical conditions without said step (a);
(c) at least one pH adjusting agent in an amount effective to improve the activity of the at least one preservative and/or inhibit microbial growth on the surface of a dough based product prepared in a pan treated with the pan release composition wherein the at least one pH adjusting agent is added in an amount effective to lower the QH of the surface of the dough and/or bread prepared from the dough by a factor of at least 0.01 pH units.

* * * * *

UNITED STATES PATENT AND TRADEMARK OFFICE
CERTIFICATE OF CORRECTION

PATENT NO. : 7,575,769 B2  Page 1 of 1
APPLICATION NO. : 10/941436
DATED : August 18, 2009
INVENTOR(S) : de Levita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 911 days.

Signed and Sealed this

Seventh Day of September, 2010

David J. Kappos
*Director of the United States Patent and Trademark Office*